United States Patent [19]

Verboom et al.

[11] Patent Number: 5,574,706
[45] Date of Patent: Nov. 12, 1996

[54] FOCUS OFFSET OPTIMIZATION FOR READING OPTICALLY RECORDED DATA

[75] Inventors: Johannes J. Verboom, Black Forest; Keith W. Malang, Niwot, both of Colo.

[73] Assignee: North American Philips Corporation, New York, N.Y.

[21] Appl. No.: 270,511

[22] Filed: Jun. 28, 1994

Related U.S. Application Data

[63] Continuation of Ser. No. 994,573, Dec. 22, 1992, abandoned.

[51] Int. Cl.[6] .................................................. G11B 7/095
[52] U.S. Cl. ............................ 369/44.26; 369/44.34; 369/44.35; 369/54
[58] Field of Search ........................ 369/47, 44.26, 369/44.32, 44.34, 44.29, 44.35, 44.36, 124, 275.1, 275.4, 54, 44.25, 44.31; 360/77.05, 77.07, 77.08; 250/201.5

[56] References Cited

U.S. PATENT DOCUMENTS

| | | | |
|---|---|---|---|
| 4,464,741 | 8/1984 | Compaan | 369/45 |
| 4,907,212 | 3/1990 | Pharris et al. | 369/45 |
| 5,099,467 | 3/1992 | Sumihiro et al. | 369/44.34 |
| 5,134,602 | 7/1992 | Baca et al. | 369/44.27 |
| 5,136,569 | 8/1992 | Fennema et al. | 369/44.27 |
| 5,164,932 | 11/1992 | Fennema et al. | 367/44.32 |
| 5,191,571 | 3/1993 | Fukumoto et al. | 369/44.34 |
| 5,199,011 | 3/1993 | McDonald et al. | 369/44.34 |
| 5,235,576 | 8/1993 | Shigemori | 369/44.26 |

OTHER PUBLICATIONS

LMSI, Pulse Length Modulation with the 1.7RLL Code Apr. 29, 1991, all pages.
ANS, 130mm Worm with 4/15 Encoding, Part 4.

*Primary Examiner*—Aristotelis Psitos
*Assistant Examiner*—Thang V. Tran
*Attorney, Agent, or Firm*—David R. Treacy

[57] ABSTRACT

During recording or reading of data in an optical record carrier such as a disc, focus is optimized by adding a focus offset signal to the focus servo error signal. Each frame contains pre-formatted control marks in a servo field, and reference data marks recorded there at a time of data recording. The focus offset signal is optimized by spacing the reference data marks a distance as close as any data marks between which a zero or non-recorded position must be resolved, and taking samples of the optical readout signal as the optical scanning beam passes over or adjacent the reference marks. Four samples are used, taken between the peaks of the signal corresponding to the two reference data marks.

14 Claims, 3 Drawing Sheets

FOCUS OFFSET OPTIMIZATION FOR READING OPTICALLY RECORDED DATA

This is a continuation of application Ser. No. 07/994,573, filed Dec. 22, 1992 now abandoned.

BACKGROUND OF THE INVENTION

1. Field of the Invention

The invention relates to the field of recording and reading of data by a beam of radiation which is focused to form a spot on a substantially planar recording layer in a record carrier or medium, the spot and recording layer being moved relative to each other in at least one direction parallel to the layer. Marks or pits (hereinafter referred to generally as marks) in the recording layer cause a change in a parameter describing return radiation which is either transmitted through, or reflected by, the layer. In order to maximize the density of data recording, it is desirable to make these marks quite small and to place them close to each other.

A common form of recording medium is a transparent disc or substrate on which a recording layer is formed or deposited, and data are later recorded in the form of marks formed by optical or magneto-optical processes. Usually such a disc is "pre-formatted," by incorporating a track pattern which defines a spiral track centerline, or a multiplicity of circular track centerlines, and divides the tracks into frames or segments. A common pre-formatting technique, especially useful with the instant invention, involves forming pits or bumps (hereinafter referred to as control marks) in or at a surface of the recording layer. These control marks are arranged at the beginning of each frame in a so-called servo field, which includes clock and address pits used to establish read clock synchronization and frame identification. Frequently it is possible to pre-format control marks which are smaller in size than the recorded data marks.

Tracking and data readout use an optical beam from a semi-conductor laser, focused into the smallest possible spot for reading the pits and recorded data marks. To accomplish this some form of focusing servo is always required.

Another technique for organizing control information and data is commonly referred to as "continuous composite servo" (CCS). Instead of distributing control information at the beginning of each frame, a relatively long header or preamble is formed at the beginning of each sector. The sector is of such length that it may be divided into frames, but the individual frames do not start with a complete servo field.

As recording density has increased, and the reading beam spot has shrunk in size, variations in the thickness and flatness of the medium, whether disc, card or tape, and unavoidable variations in the focusing system, have led to highly sophisticated schemes for optimizing the beam focus with respect to the recording layer.

2. Description of the Prior Art

The basic procedure for setting the focus for a reading beam has been to use a focus servo to optimize the beam reflected from, or transmitted through, the medium. This method involves controlling the focus drive to minimize an error signal based on the size or position of a spot or pair of spots on a detector. For example, U.S. Pat. No. 4,464,741 to Compaan teaches a focus detector which images stigmatized patterns of the beam spot onto a 4-quadrant detector. This requires that the disc have a sufficiently large blank or unrecorded area so that the beam spot has even reflectance around its perimeter. The same optical system is also used for detecting clock signals in a pre-recorded servo track, and tracking errors.

An improvement in data readout is obtained by the technique of focus offset, for example as described in U.S. Pat. No. 4,907,212 to Pharris and Schell. According to the invention disclosed therein, focus calibration involves comparing the value of a signal at an isolated mark with the signal at an immediately preceding or following mark position, and adjusting a focus offset signal added to the focus servo error signal until the difference between the signals at the mark and the vacant (no mark) position is maximized. The offset value which causes that optimum read signal is then used as a fixed correction to the focus servo during normal readout.

The method of the '212 patent uses reflectance in the vicinity of a servo mark, particularly pre-recorded clock signals. After read timing calibration has been conducted, a series of comparisons are made between the reflectance at approximately the high point of the received signal from the pre-formatted mark (pit) and that at another point a fixed distance away. In many circumstances this requires a technician to substitute a special disc for the one normally in use in a particular drive.

In one well-known optical data recording drive, the LD510 sold by Laser Magnetic Storage International Company, the medium is a 5¼ inch diameter disc having pre-formatted clock pits. Every time a new disc is inserted in the drive, and every time the drive goes into its calibration mode, the electrical focus-offset signal is automatically determined. The read beam is directed toward a track, and because of relative motion due to rotation of the disc about its axis, the beam scans over or near the servo and clock pits, and the focus servo is caused to vary over a range to locate the focus position which provides a maximum read signal from the clock pits.

Re-calibration of sophisticated, high density data readout systems is often initiated automatically. For example, the temperature of the optical data drive may be monitored, and re-calibration initiated whenever the system detects a temperature change greater than a predetermined amount. The detected signal quality can be measured, and re-calibration be initiated whenever the signal quality has fallen below a predetermined threshold, or has degraded by an excessive amount.

Some known systems, and proposed systems, include recording of reference marks between the servo field and the data field of a frame, or as part of a preamble in a CCS system. These marks are recorded when data are recorded, and are used during readout to set a threshold value for detection of marks (ones) as opposed to blanks (zeroes) in the following data field. However, these reference marks have not been used for setting or optimizing focus offset values.

These prior art techniques can provide fairly accurate focus optimization if sufficient time and circuit power are available, so that the focus mechanism can be stepped over a portion of its range to each side of the setting at which a four-quadrant detector or the like indicates an optimum signal—generally, the highest peak and steepest skirts when scanning over a recorded mark. However, the clock pits are not closely representative of the data marks whose reading is the goal of the whole process, because the control marks may be smaller than the data marks, may have an effective position within or adjacent the recording layer different from the data marks, and may have a larger clear adjoining space than is true of the data marks.

SUMMARY OF THE INVENTION

An object of the invention is to provide an optimized focus-offset signal which will cause the signal received, when reading actual recorded data, to be maximized.

Another object of the invention is to optimize the detected waveform for the worst-case pattern of actual recorded data.

According to the invention, during recording of data the medium is provided with recorded reference data marks at standard locations. Upon start-up, and whenever recalibration is required, samples of the read beam signal corresponding to the reference data marks are evaluated, and the focus-offset signal is adjusted to optimize the detected waveform.

Preferably, each frame of recorded data includes a reference field having two marks, spaced apart a distance no greater than the smallest distance between two successive data marks (ones) which must be resolved as a blank space or zero. In a recording system where the control marks are smaller than the recorded data marks, and the clock positions are spaced about the size of the control mark, improved readout accuracy can be obtained with a data code that uses short sequences of ones and zeroes, so that the apparatus need not reliably identify a zero at a single clock position between adjoining clock positions containing data marks designating ones. When two adjoining empty clock positions is the shortest which must be resolved, this same spacing is used for the reference marks.

During calibration or re-calibration, through the use of high speed sample-and-hold circuits, or a fast analog-to-digital converter, a plurality of samples of the read-out signal for these marks are taken automatically under the control of the read clock, and evaluated. From these samples the clock phase error, threshold for data mark detection, and optimization of focus are determined.

In a preferred embodiment, the medium is a spinning disc, on which the reference marks are aligned radially on successive tracks, thus guaranteeing a minimum spacing. The disc includes at least one Standard Format Part (SFP) track which contains information about the disc's format and recording requirements. Such a format is described in document X3B11/87-010, referring to a 130 mm Sampled Servo Standard. In addition to this information, this track contains reference marks recorded in the recording layer. According to this aspect of the invention, during initial calibration the beam is moved to the SFP track to read the format and related information, and to establish focus-offset.

According to a further preferred embodiment, an optical recording disc has three SFP tracks, located at the inner and outer radii, and in the middle. Upon initial spin-up of a disc, the optical head will drive to one of the SFP tracks prior to initial generation of a focus offset signal. Once the drive has locked onto the SFP truck, the reference marks in this track are used to determine a focus-offset value which is stored. The other FSP tracks are then accessed, and focus-offset values are determined and stored. During data readout, the focus-offset value for the FSP track nearest the track to be read is selected from the stored values.

DESCRIPTION OF THE PREFERRED EMBODIMENT

Figure 1:
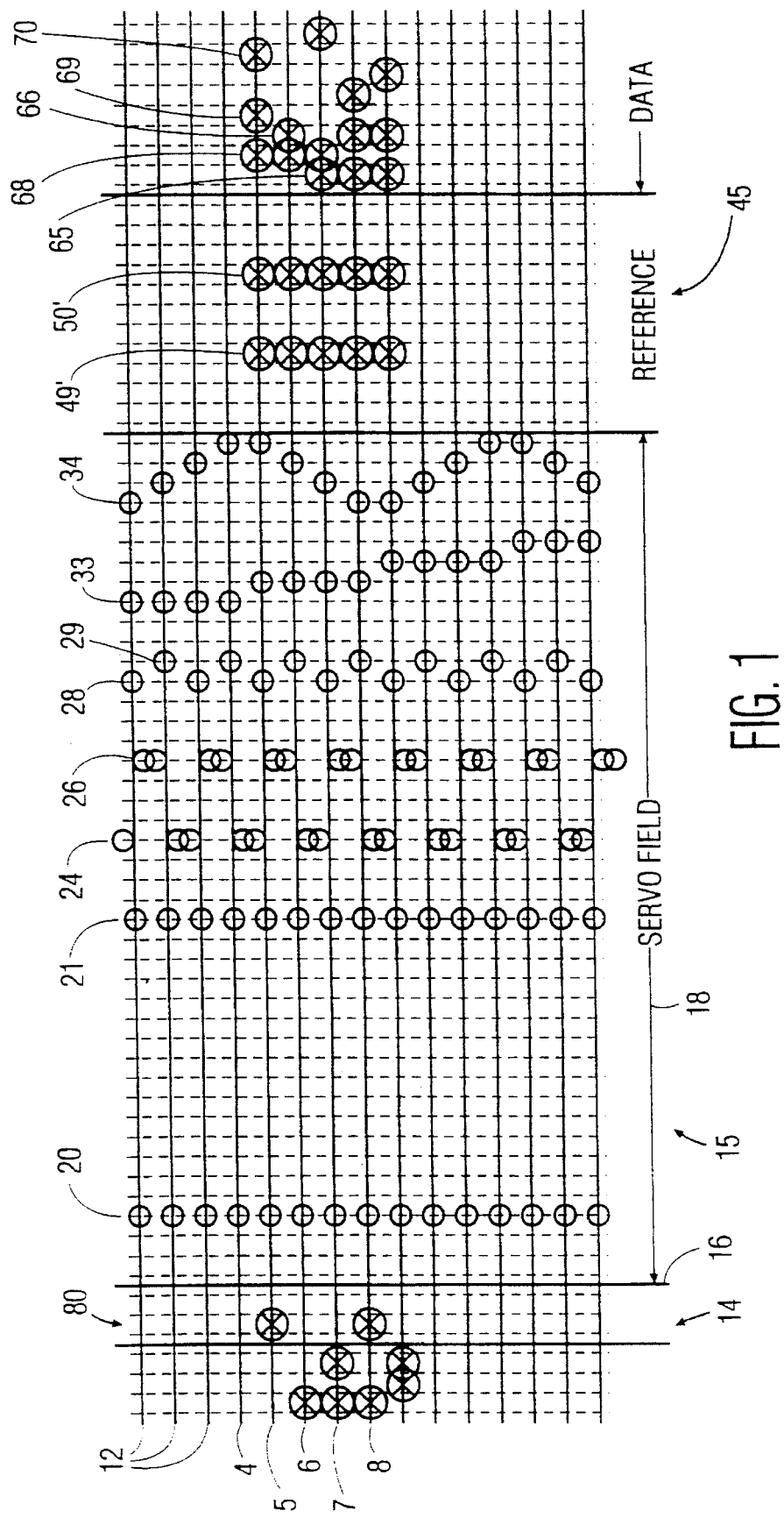
FIG. 1 is a schematic diagram showing pre-formatted pits or marks in servo fields, and reference and data marks recorded subsequently.

As shown schematically in FIG. 1, a portion of a band 10 on an optical data storage disc contains a large number of tracks 12 which are concentric with each other. In turn, each track is divided into frames, portions of frames 14 and 15 being shown in the drawing. At least within one band, the frames are aligned radially, and may be considered as though separated by a dividing line 16 from which the positions for pits or marks are counted.

In accordance with well-known methods of identifying the beginning of a frame and its address, and synchronizing the reading clock and the tracking servo, preformatted pits or marks are provided in specific locations within a "servo" field 18 defined for the selected format. In the preferred embodiment disclosed herein, the first and second pits 20 and 21 in the servo field are located in positions 4 and 19. The distance between these pits, 15 positions, is a unique distance different from that found between any valid pits or marks which may subsequently be recorded. The drive electronics uses this unique distance to identify the pit at position 21 as the "clock" pit for synchronization of the read clock.

Wobbled servo tracking pits 24 and 26 are located at positions 23 and 27, the pits being alternately offset to the outside and the inside of the track centerline. Adjoining tracks have the first of these offset in opposite directions, so that, for example, the pits 24 for tracks 4 and 5 overlap partially. To aid in quick identification of the track, the so-called "cosine" pits 28 are located at position 31 in even-numbered tracks, and the cosine pits 29 for odd-numbered tracks are at position 32. In the preferred format, two pits 33, 34 at positions 35 through 43 are arranged in a "gray" code, to provide an address nibble. The full address is a byte made up of a plurality, preferably four, nibbles, each of these nibbles being found in a respective one of four frames in sequence.

According to the invention, a reference field is also included in each frame, and contains reference marks which are spaced apart a distance no greater than the smallest distance between data marks which must be resolvable as separate marks. In the embodiment shown in FIG. 1, a reference field 45 is recorded immediately following the servo field. It occupies positions 44 through 55, and contains two reference marks 49' and 50' separated by two blank positions; that is, one mark overlaps positions 47 and 48, and the other overlaps positions 51 and 52.

In this embodiment, data are recorded in a 1,7 run-length-limited (1,7RLL) code, as defined in document X3B11/91/300-044 distributed at an ANSI meeting in April, 1991. This code has advantages when the data marks are large enough that they cover two adjoining positions. In this code, various patterns are described. The "L2" pattern uses single data marks straddling two clock positions, then two blank clock positions, then another single data mark straddling two positions, then two more blank clock positions, and so on. It is decoded as the bit string 11001100. This is the shortest blank space which must be resolved. Other patterns have strings of three or more ones formed by two or more marks which may overlap, may abut each other, or may be separated by a single unmarked position which is interpreted as though it is a one.

As shown in FIG. 1, when a reference mark 49' is recorded, it is centered between clock positions 47 and 48 and covers at least most of each of those positions. Similarly, as shown for example in track 6, marks 65 and 66 overlap, and cover positions 57 through 59, so that this is identified as three ones. In track 4, one mark 68 covers positions 57 and 58; another mark 69 covers positions 59 and 60, and a third mark 70 covers positions 62 and 63. With this mark sequence, the position 61 is a "don't care" position, and need not be resolved. According to the 1,7RLL code, track 4 will be read as having the equivalent of 5 ones, whether or not position 61 is marked. To make it clear where the end of the data field is, a mark may be recorded in the termination field 80, depending on the previous bit string.

It will be clear to those of ordinary skill that any other recording code can be used. If the space between marks, which must be read as a space for correct decoding, is smaller, then so also must be the space be made smaller between reference marks.

Figure 2:
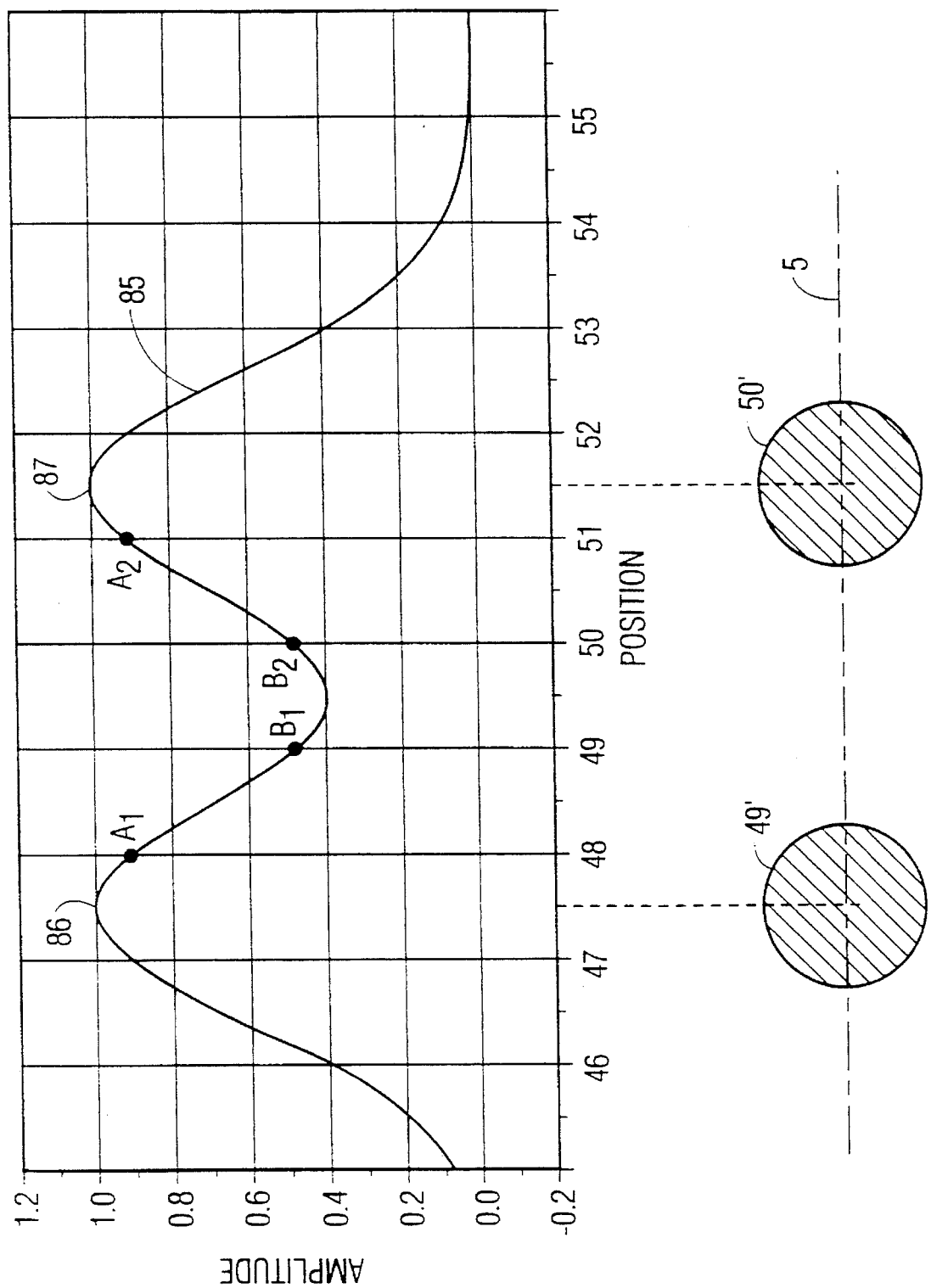
FIG. 2 is a timing diagram showing the reference marks and a resultant readout waveform.

The timing diagram for offset calibration, shown in FIG. 2, clearly demonstrates the significance of data marks being larger than the clock positions. The detector waveform 85 has peaks 86 and 87 at the time of maximum data signal, midway between clock positions 47 and 48 and between positions 51 and 52 respectively. To verify that a strong signal is being produced, and that the clock is properly synchronized, four samples of the signal are taken. In the preferred embodiment, high samples $A_1$ and $A_2$, and low samples $B_1$ and $B_2$, are taken at clock positions 48, 51 and 49, 50 respectively.

These samples are used for verifying the read clock phase, the threshold TH for detection of a mark, and the adequacy of focus (which affects the signal strength), as follows:

$$TH=0.25(A_1+A_2+B_1+B_2)$$

If $A_1>A_2$ and $B_1>B_2$ then the clock phase is early.
If $(A_1+A_2)-(B_1+B_2)>K$,
where K is a predetermined value, then signal strength is sufficient that re-calibration should not be started. To determine the optimum offset signal, the offset voltage should be changed, new samples are taken, and the value $(A_1+A_2)-(B_1+B_2)$ is again calculated. The optimum offset signal is the one which provides the highest value for $(A_1+A_2)-(B_1+B_2)$.

Figure 3:
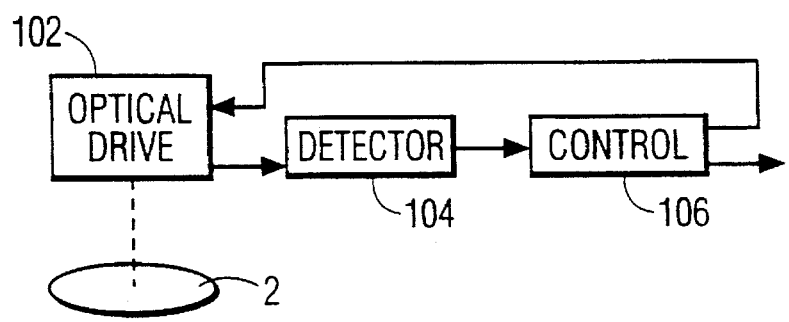
FIG. 3 is a block diagram of an optical data storage apparatus according to the invention.

An apparatus according to the invention, as shown schematically in FIG. 3, comprises an optical drive unit 102, a detector circuit 104, and a control unit 106 including a microprocessor. The optical drive unit 102 may be a so-called WORM (write once, read many) in which data writing causes an irreversible change in the reflectance of a recording layer on a record carrier 2 formed as a glass disc, or an erasable magneto-optical unit, but the invention is not limited to those applications. While the invention as now contemplated would be most applicable to high capacity optical disc drives, it may also be advantageous in smaller or portable units when the state of miniaturization has advanced that far. The record carrier 2 may alternatively be a card which is scanned by a moving spot, or could be a tape having an optically readable thin recording layer.

The detector 104 may be a 4-quadrant detector used for servo tracking and data readout, or any other type which senses a change in magnitude or characteristic of the radiation beam which is reflected from or transmitted through the record carrier. The control unit 106 contains drive electronics assemblies of well-known types for controlling the drive of the optical disc or other form of carrier, for controlling the scanning beam for writing or reading, and for controlling the calibration process.

Data read-out, after decoding and/or pulse shaping, is provided from the microprocessor in the control unit 106.

Figure 4:
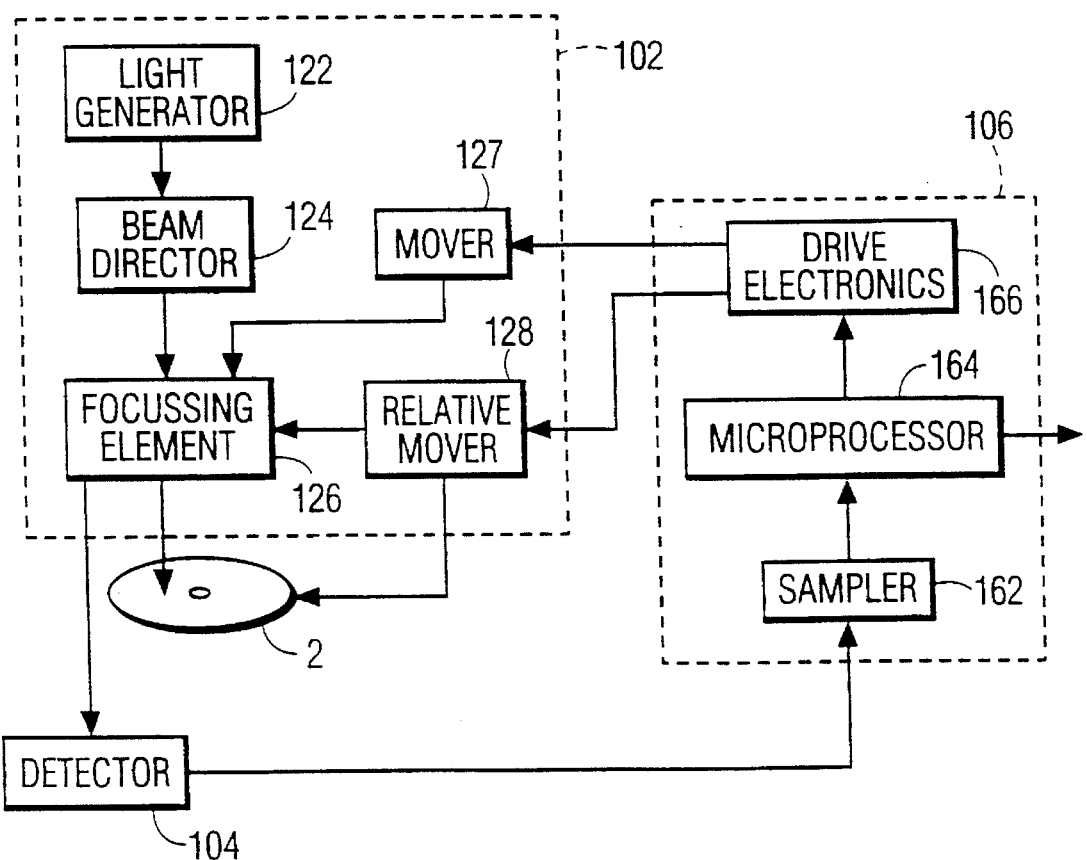
FIG. 4 is a block diagram of the system of FIG. 3 in greater detail.

As is well known, and shown in FIG. 4, the optical drive unit 102 will typically include a device 122 for generating a beam of light, a device 124 for directing the beam of light toward the recording layer of the record carrier 2, a focussing element 126 for converging the beam to a spot in a reading plane of the record carrier 2, a device 127 for moving the focussing element, and a device 128 for providing relative movement between the spot and the recording layer in a direction parallel to the layer. The detector 104 has a surface or structure, such as a 4-quadrant detector, for intercepting light from the spot and producing a focus servo error signal and an electrical waveform representative of values of a parameter of the light from the spot. The control unit 106 contains control electronics, including sampling circuitry 162 for sampling portions of the electrical waveform, and a microprocessor 164, for receiving the servo error signal and adding a focus offset signal to it, and automatically calibrating by controlling the devices 127 and 128 via drive electronics 166 to direct the beam to a given track different from a selected track.

Alternative Embodiments

High capacity storage devices such as optical drives will usually include substantial digital signal processing capacity. When this is the case, it is easy to store the entire servo field detected values in a RAM for processing or comparison purposes during the balance of the frame.

To optimize focus, assuming that samples have an acceptable spread of value, from high to low, such that the data read out are deemed reliable, (that is, $(A_1+A_2)-(B_1+B_2)>K$)), periodically at a time that the drive will be accessing successive frames along one track, the drive will alter the focus-offset signal by a small given amount in one direction. Samples from the next pair of reference data marks scanned will be evaluated. If the high-to-low value spread is equal to or greater than that of the preceding sets of samples, evaluation will continue with the new value of focus-offset. If the high-to-low value spread is less than that of the preceding sets of samples by at least a small predetermined amount, the focus-offset signal will immediately be altered in the opposite direction by twice the given amount, and evaluation will continue.

The inventive method makes it possible to maintain an optimum focus-offset signal without loss of time from the reading operation, and with minimal risk of introducing data errors during the optimization procedure.

The invention is also useful with CCS recording and readout. It merely requires that the sector preamble, or other location, contain recorded reference marks in identifiable positions which produce a worst-case readout signal.

Accordingly it is clear that the invention is not limited to the embodiments disclosed herein, and has applications measured only by the appended claims.

What is claimed is:

1. A method of optimizing the focus of a reading beam which is focused on a recording layer which forms part of a record carrier, comprising the steps of:

generating a radiation beam and directing said beam toward said recording layer, providing a focusing element for converging said beam to a spot in a reading plane, and a focus servo, including a focus detector providing a servo error signal, for moving said focusing element, providing relative movement between said spot and said layer in a direction parallel to said layer, responsive to impingement of said radiation beam on said recording layer, receiving an energy beam from said recording layer, wherein a parameter of said energy beam is affected by marks in said medium, detecting a waveform representing values of said parameter, and controlling said focusing element to optimize said waveform by adding a focus offset signal to said servo error signal, characterized in that said controlling step is responsive to a respective waveform representing values of said parameter resulting from recorded reference data marks which have a mutual spacing equal to the minimum spacing between resolvable data marks in said recording layer.

2. A method as claimed in claim 1, wherein said marks are arranged in a multiplicity of tracks, each track being divided into a plurality of frames; and said carrier contains pre-formatted control marks formed therein, each frame having a servo field in which respective pre-formatted control marks are formed, and said carrier having at least one given track in which respective said reference data marks are recorded in at least one servo field, characterized in that said controlling step includes a calibration step comprising:

directing said beam toward said given track, detecting said waveform representing values of said parameter resulting from the recorded reference data marks in a frame of said given track, determining a calibration value of said focus offset signal based on the recorded reference data marks in said frame of said given track, and using said calibration value for the controlling step when reading data recorded on tracks other than said given track.

3. A method as claimed in claim 2, wherein said recording layer is formed on a substrate having control marks formed therein prior to recording of said marks in said recording layer.

4. A method as claimed in claim 3, wherein said control marks are clock pits impressed in the substrate.

5. A method as claimed in claim 2, characterized in that said reference marks form part of preambles of said frames.

6. A method as claimed in claim 2, characterized in that said controlling step further comprises, during recording of data in a given frame, recording a respective reference field in said given frame, having two reference marks at respective reserved positions spaced apart said minimum spacing, and reading of data from said given frame includes the steps of first taking four samples of said parameter between the instant that, due to the relative motion, the center of said spot passes the first of said reference marks recorded in said given frame and the instant said center reaches the second of said reference marks recorded in said given frame, and then evaluating the waveform corresponding to said four samples and adjusting said calibration value.

7. An apparatus for reading data marks optically recorded on a medium which includes a recording layer, wherein said recording layer contains marks which affect a parameter of light impinging thereon, comprising:

means for generating a beam of light and directing said beam toward said recording layer, a focusing element for converging said beam to a spot in a reading plane, and a focus servo, including a focus detector providing a servo error signal, for moving said focusing element, means for providing relative movement between said spot and said layer in a direction parallel to said layer, means for intercepting light from said spot, and producing an electrical waveform representative of values of said parameter, and means for controlling a condition of said focusing element to optimize said waveform, by adding a focus offset signal to said servo error signal, characterized in that for reading data marks disposed in one of a multiplicity of regions on said layer, each region including two recorded reference data marks which have a mutual spacing equal to the minimum spacing between any other data marks in said region, said means for controlling comprises:

means for sampling at least four portions of the electrical waveform corresponding to said two recorded reference data marks, to produce four samples, means for computing a signal strength value based on said four samples, and means, responsive to the computed signal strength value, for selecting an optimum value of said offset signal, and maintaining said optimum value during reading of data marks in said one region.

8. An apparatus as claimed in claim 7, for recording said data marks in a selected one of a multiplicity of tracks, each track being divided into a plurality of frames; wherein said carrier contains pre-formatted control marks formed therein, each frame having a servo field in which respective preformatted control marks are formed, and said carrier having at least one given track in which respective said reference data marks are recorded in at least one servo field, wherein said apparatus includes means for automatically calibrating, characterized in that said means for automatically calibrating comprises means for directing said beam toward a given track different from said selected track, said means for controlling selects said optimum value based on the recorded reference data marks in said given track, and maintains said optimum value during reading of data marks in said selected track.

9. An apparatus as claimed in claim 8, characterized in that said means for sampling takes four samples of said parameter between the instant that, due to the relative motion, the center of said spot passes the first of said reference marks recorded in said given frame and the instant said center reaches the second of said reference marks recorded in said given frame, and the apparatus then evaluates the waveform corresponding to said four samples and adjusts said calibration value.

10. A combination of a record carrier and an apparatus, wherein said record carrier includes a substantially planar recording layer comprising a plurality of recorded regions which respectively contain marks which affect a parameter of light impinging thereon, said marks including respective data marks optically recorded on the record carrier; said apparatus is arranged for reading said respective data marks; and said combination comprises:

means for generating a beam of light and directing said beam toward said recording layer, a focusing element for converging said beam to a spot in a reading plane, and a focus servo, including a focus detector providing a servo error signal, for moving said focusing element to position said reading plane with respect to said recording layer, means for providing relative movement between said spot and said layer in a direction parallel to said layer, means for intercepting light from said spot, and producing an electrical waveform representative of values of said parameter, and means for controlling a condition of said focusing element to optimize said waveform, by adding a focus offset signal to said servo error signal, characterized in that each said recorded region includes two respective recorded reference data marks which have a mutual spacing equal to the minimum spacing between any other data marks in said region, the electrical waveform obtained by reading said two respective recorded reference data marks thereby being a waveform having a "worst-case" signal to noise ratio, and said means for controlling comprises:

means for sampling portions of the electrical waveform corresponding to said two recorded reference data marks in one of said recorded regions, to produce a plurality of samples, means for computing a signal strength value based on said plurality of samples, and means, responsive to the computed signal strength value, for selecting an optimum value of said offset signal, and maintaining said optimum value during reading of data marks in said one of said recorded regions.

11. A combination as claimed in claim 10, wherein said recording layer includes at least one unrecorded region free from data marks and reference data marks, and said apparatus comprises:

means for recording two said reference data marks, having a given mutual spacing therebetween, in a reference field in said unrecorded region, and means for recording respective data marks, having a minimum spacing therebetween equal to said given mutual spacing, in said unrecorded region immediately after recording said two said reference data marks.

12. A combination as claimed in claim 11, characterized in that said means for sampling samples four portions of said electrical waveform, said plurality of samples thereby being four samples.

13. A combination as claimed in claim 12, wherein said recording layer further includes a multiplicity of tracks, each track being divided into a plurality of regions; said record carrier contains pre-formatted control marks formed therein, each region having a servo field in which respective preformatted control marks are formed, and said carrier having at least one given track in which respective said reference data marks are recorded in at least one servo field, wherein said apparatus includes means for automatically calibrating, characterized in that, for reading data marks in a selected track different from said given track, said means for automatically calibrating comprises means for directing said beam toward said given track, and said means for controlling selects said optimum value based on the recorded reference data marks in said given track, and maintains said optimum value during reading of data marks in said selected track.

14. An apparatus as claimed in claim 11, characterized in that said means for sampling takes four samples of said parameter between the instant that, due to the relative motion, the center of said spot passes the first of said reference marks recorded in said one of said regions and the instant said center reaches the second of said reference marks recorded in said gone of said regions, and then evaluates the waveform corresponding to said four samples to select said optimum value.

* * * * *